Dec. 15, 1964  R. W. BURTON  3,161,253
DRIVE LINE SUPPORT MEANS
Filed May 28, 1962
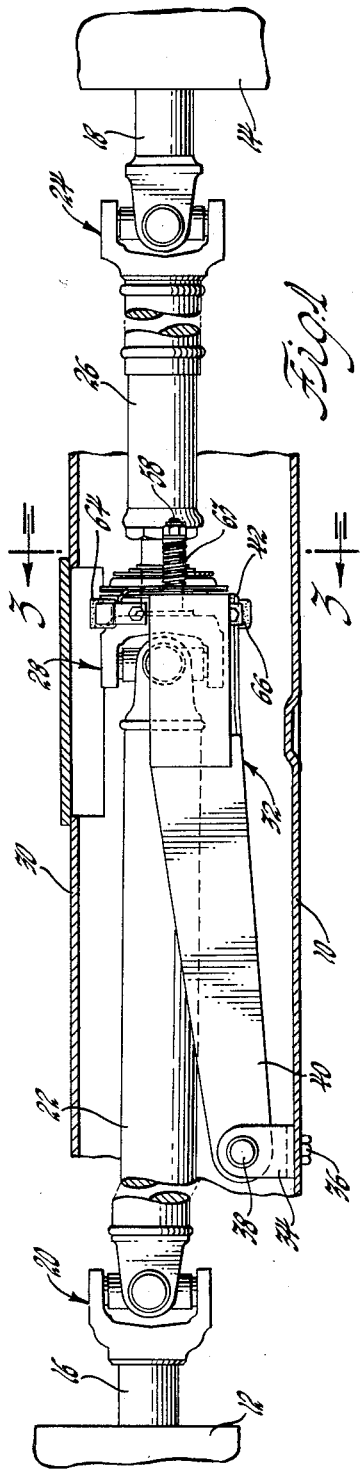
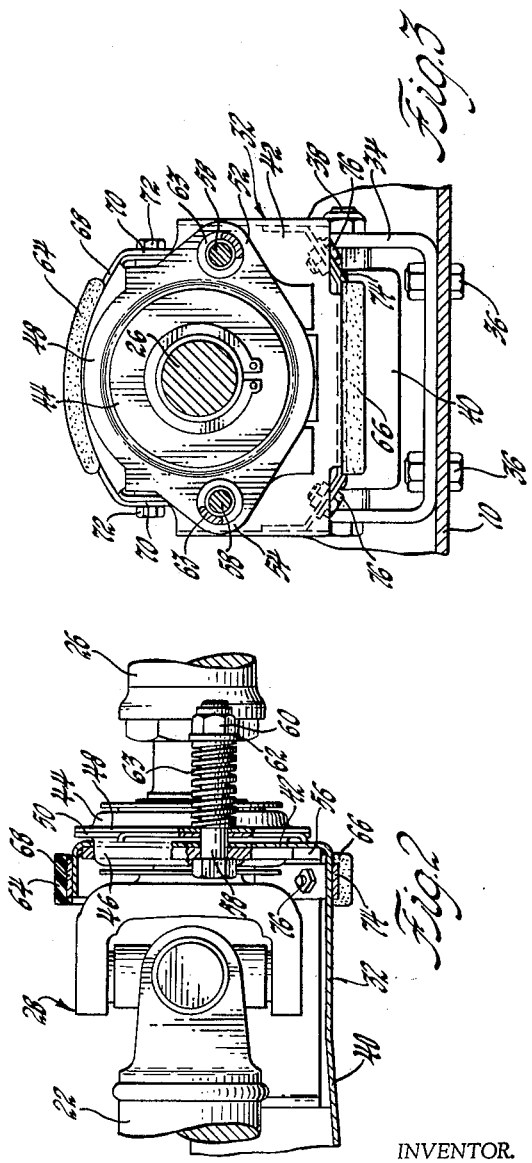
INVENTOR.
Robert W. Burton
BY George A. Schmidt
ATTORNEY United States Patent Office 3,161,253
Patented Dec. 15, 1964

3,161,253
DRIVE LINE SUPPORT MEANS
Robert W. Burton, Farmington, Mich., assignor to General Motors Corporation, Detroit, Mich., a corporation of Delaware
Filed May 28, 1962, Ser. No. 198,377
3 Claims. (Cl. 180—70)

This invention relates to motor vehicle drive lines, and more particularly to a means for supporting a motor vehicle drive line to balance secondary couple forces therein.

In the design and manufacture of structures such as motor vehicles where a driving means is located at one end of a frame and an output means is located at the rear end of a frame, it is necessary to provide a drive line construction to transmit the driving torque from the drive means to the output. In the typical motor vehicle the engine and transmission assembly is located at the front of the vehicle and the differential and rear axle assembly is located at the rear of the vehicle. The power transmission is from the engine through the transmission and differential unit to the rear axle.

It is common to employ propeller shafts to accomplish the torque transmission from the engine to the rear axle. The propeller shaft must be so located as to properly transmit the torque and at the same time provide as little interference as possible with the floor of the vehicle. One way in which this may be accomplished is by using a two-piece propeller shaft wherein the two pieces are connected by a universal joint located generally centrally of the vehicle. A universal joint connects the front of the front shaft portion to the transmission output shaft, and another universal joint connects the rear of the rear shaft section to the differential input shaft. In order to provide the proper profile, the engine of the vehicle is generally tilted to permit the propeller shaft to slope downwardly and rearwardly and the differential assembly may be tilted in the opposite direction so that the propeller shaft at the rear slopes upwardly. This permits the center of the propeller shaft to be as low as possible.

In using such a propeller shaft construction the driving torque causes a force couple to exist, the force being at generally right angles to the operating torque. This is generally referred to as a secondary couple force. It is necessary to balance or somehow compensate for the secondary couple force for proper operation of the vehicle. The secondary couple forces have been found to be dependent on the respective angles of the various universal joints between the shaft sections and the resultant angular relationship between the several sections. In the usual motor vehicle assembly the differential and rear axle construction varies in height due to the load on the vehicle and due to various irregularities in the road surface. This change in height causes a change in angularity between the front and rear shaft sections and thus changes the secondary couple force balance in the propeller shaft.

It has been the practice in the past to rigidly secure the front propeller shaft section to the frame and compromise on the changing couple force. This means that the propeller shaft will go through unbalanced conditions due to the change in angularity between the front and rear shaft sections which is objectionable to the operation of the vehicle.

The device in which this invention is embodied comprises, generally, a means for supporting the propeller shaft in such a manner as to balance the secondary couple forces through the normal changes in angularity between the front and rear shaft sections caused by differences in height in the differential and rear axle assembly. The universal joint connecting the front and rear shaft sections is permitted to move in generally a vertical plane as the differential and rear axle assembly changes in height, the movement being so proportioned as to provide a secondary force balance and eliminate the objections caused by an unbalanced system.

A particular construction is illustrated and described to accomplish this result although it is possible that other methods may also be provided. The particular construction shows a cradle member which is secured to the frame forwardly of the central universal joint and extends rearwardly to be secured to the propeller shaft at the rear of the central universal joint. The length of the cradle member is such that the secondary couple forces will be balanced under all normal conditions of operation of the propeller shaft. This device is relatively easy to manufacture and assemble, comprises few moving parts, and accomplishes the desired result in an efficient and economical manner.

These and other advantages will become more apparent from the following description and drawing, in which:

FIGURE 1 is an elevational view of a drive line in a construction, with parts broken away and in section to illustrate the position of the various parts;

FIGURE 2 is an enlarged sectional view of a portion of the drive line illustrated in FIGURE 1 showing the connection to the propeller shaft at the central universal joint; and FIGURE 3 is a cross-sectional view of the drive line illustrated in FIGURE 1, taken substantially along the line 3—3 of FIGURE 1 and looking in the direction of the arrows.

Referring more particularly to the drawing, a typical power transmission system is illustrated. In this instance it may be a motor vehicle having a frame 10 connecting an engine and transmission assembly 12 and a differential and rear axle assembly 14. A transmission output shaft 16 serves as a torque take-off shaft for driving the differential input shaft 18 at the opposite end of the vehicle. A universal joint, illustrated generally by the numeral 20, is secured to the transmission output shaft and a front shaft member 22 is secured to the rearward end of universal joint 20. A universal joint 24 is connected to the differential input shaft 18 and a rearward shaft member 26 is connected to the forward end of universal joint 24. In order to connect shaft members 22 and 26 a central universal joint, illustrated generally by the numeral 28, connects the adjacent ends of the shaft members in any suitable manner. The usual drive line tunnel cover 30 is disposed above the drive line and may serve as a base for the floor of the vehicle.

As the load in the vehicle changes it is easily seen that the differential and rear axle assembly 14 will change in vertical height. This causes a change in angularity of the shaft member 26 and thus a change in angularity between the shafts 22 and 26 in the plane of the drawing. Universal joint 28 and universal joints 20 and 24 are so constructed to permit proper torque transmission under angle changes. However, the secondary balance couple forces in the drive line must be balanced in order to eliminate objectionable vibrations and the like which would cause harm to the drive line. This is accomplished by permitting the central universal joint 28 connecting shaft members 22 and 26 to move in a generally vertical plane so that the proper angularity of shafts 22 and 26 are maintained to balance the secondary couple forces.

In order to accomplish this function a cradle assembly, illustrated generally by the numeral 32, may be provided. It is to be understood that this is only one system of accomplishing the result and it is conceivable that other systems might be provided which would fall within the scope of the invention.

A pivot bracket member 34 is secured to the frame 10 in any suitable manner, such as by nut and bolt assembly 36. Pivot bracket member 34 is preferably located forwardly of the central universal joint 28. A pivot pin 38 is secured in the bracket 34 in any suitable manner. A channel-shaped cradle arm 40 receives pivot pin 38 at its forward end and is permitted to rotate about pivot pin 38. Cradle arm 40 extends rearwardly of the drive line and is provided with an upturned wall 42 which is received about the propeller shaft, as best illustrated in FIGURE 2. The construction ilustrated in the drawing is provided with a sheet metal bearing housing, having parts 44 and 46 joined by outwardly formed flanges 48 and 50. Flanges 48 and 50 are provided with ears 52 and 54 for purposes to be later described.

Wall 42 of the cradle member 40 is shown in FIGURE 2 to surround the bearing housing portion 46 and it is necessary to secure the wall 42 to the housing 46, and thus to the propeller shaft in such a manner as to permit relative movement therebetween under certain conditions. In the typical drive line construction the rear axle causes temporary, large angle differences because of extreme travel. This would happen during bounce or rebound of the rear axle caused by road conditions. Some provision must thus be made so that extreme travel will not destroy the connection. Furthermore, when the drive line moves upwardly or downwardly there will be a slight change in angularity between the wall 42 of the cradle member 40 and the flanges 48 and 50 of the bearing housing 44–46. Although this change is slight it is necessary to retain as rigidly as possible the connection between the wall 42 and the bearing housing. To accomplish these functions and permit the above-described relative movements, a plate member 56 may be located forwardly of the wall 42 for strengthening purposes and a bolt 58 extends through suitable apertures in the plate 56, wall 42 and ears 52–54. A nut 60 and washer 62 secure the bolt against a compression spring 63 seated between bearing housing ear 54 and the washer 62. The spring force is such as to retain the parts together as rigidly as possible and still permit the changes in angularity due to extreme travel positions of the rear axle and the slight angularity changes between the shaft portions.

In order to cushion upward and downward movement of the central universal joint 28 caused by extreme positions of the differential and rear axle assembly 14, bumper members 64 and 66 are provided at the top and bottom, respectively, of cradle member 40. Bumper 64 may be bonded or otherwise secured to a bumper support 68 which has downwardly turned ears 70 secured to wall 42 in any suitable manner, as by bolts 72. Similarly, lower bumper member 66 is provided with a support 74 secured to wall 42 by nut and bolt assemblies 76. Bumper members 64 and 66 thus serve to protect the structure at extreme upward or downward positions of the universal joint 28 relative to frame 10 and tunnel portion 30 under these extreme positions and permits the "breaking" of the drive line against springs 63.

As best seen in FIGURE 1, it may be noted that the front shaft member 22 is angularly disposed downwardly and rearwardly relative to the rear shaft member 26. The differential and rear axle assembly 14 may vary in height due to load conditions in the vehicle or due to road irregularities which cause changes in angularity throughout the drive line. By properly positioning pivot 38 relative to the universal joint 28 and through the use of the cradle assembly 32, the front and rear shaft members 22 and 26 will both change in angularity relative to frame 10 and relative to each other with changes in the height of the differential and rear axle assembly 14. These changes will be properly proportioned because of the location of pivot 38 and the length of cradle member 40 to balance the secondary couple forces in the front and rear shaft members 22 and 26, respectively. Thus, as the differential and rear axle assembly 14 moves upwardly the universal joint 28 will move in an upward direction and the angle between shaft members 22 and 26 will tend to increase. As the differential and rear axle assembly move downwardly the center universal joint 28 will be permitted to move downwardly, also changing the angle from the normal position between shaft members 22 and 26. Thus, the secondary couple forces will be properly balanced to avoid objectionable vibrations and the like in the drive line.

What is claimed is:

1. In a vehicle having a frame and a drive line adjacent said frame, said drive line including a pair of shaft sections connected by a universal joint, center support means for said drive line comprising:
   a cradle member pivotally secured to said frame and extending longitudinally of said drive line, said cradle having a transverse wall formed on the end thereof surrounding one of said shaft sections adjacent said universal joint;
   and resilient means securing said wall in a frictional face to face relationship to a rigid surface of a non-rotatable member transverse to the shaft axis supporting said one of said shaft sections;
   said cradle and said resilient means permitting vertical movement of said universal joint relative to said frame to balance secondary couple forces in said drive line under normal changes of angularity of said shaft sections with changes of load conditions in said vehicle.

2. In a vehicle having a frame and a drive line adjacent said frame, said drive line including front and rear shaft sections connected by a universal joint, center support means for said drive line comprising:
   a cradle member pivotally secured to said frame and of a predetermined length relative to said shaft sections, said cradle member extending rearwardly of said drive line;
   a wall formed on the end of said cradle member and surrounding said rear shaft section adjacent said universal joint;
   a bearing housing member secured to said drive line adjacent to and rearwardly of said universal joint, said housing member having ears extending outwardly therefrom;
   and a resilient connection between said wall and said ears for resiliently securing said parts together in a frictional metal to metal relationship and permitting differences in angularity therebetween;
   said support means providing a balance of secondary couple forces in said drive line under all normal conditions of angularity of said front and rear shaft sections relative to said frame.

3. The center support means set forth in claim 2 and further including resilient bumper means secured to said wall to cushion said drive line from extreme bounce and rebound positions and permit large angle changes in said universal joint at said bounce and rebound position.

References Cited in the file of this patent
UNITED STATES PATENTS

| | | |
|---|---|---|
| 2,560,759 | Evernden et al. | July 17, 1951 |
| 2,776,174 | McMillan et al. | Jan. 1, 1957 |
| 2,852,318 | Matthias | Sept. 16, 1958 |
| 2,930,660 | Dunn | Mar. 29, 1960 |